United States Patent [19]

Riback

[11] Patent Number: 4,890,982
[45] Date of Patent: Jan. 2, 1990

[54] PUMP IMPELLER AND ROTOR SHAFT ATTACHMENT CONSTRUCTION

[76] Inventor: Richard Riback, 930 North Ave., Deerfield, Ill. 60015

[21] Appl. No.: 208,884

[22] Filed: Jun. 20, 1988

[51] Int. Cl.[4] .............................................. F04D 29/20
[52] U.S. Cl. ............................... 416/241 A; 416/134 R
[58] Field of Search .......... 416/241 A, 244 A, 134 A, 416/134 R, 244 R; 403/375, 383

[56] References Cited

U.S. PATENT DOCUMENTS

| | | | |
|---|---|---|---|
| 2,558,589 | 6/1951 | Skolfield | 416/134 R X |
| 2,882,077 | 4/1959 | Marsh | 416/241 A X |
| 3,264,016 | 8/1966 | Reisch | 416/134 R X |
| 3,342,273 | 9/1967 | Crane | 416/244 R X |
| 3,376,057 | 4/1968 | Van Buren, Jr. | 416/244 R X |
| 3,567,335 | 3/1971 | David et al. | 416/244 R X |
| 3,709,633 | 1/1973 | Wooden | 416/244 R X |
| 3,872,691 | 3/1975 | Hilderbrandt | 416/241 A X |
| 4,194,847 | 3/1980 | Grey | 403/375 X |

FOREIGN PATENT DOCUMENTS 701014 12/1953 United Kingdom ................ 403/383

Primary Examiner—Everette A. Powell, Jr.
Attorney, Agent, or Firm—Laff, Whitesel, Conte & Saret

[57] ABSTRACT

A pump including an impeller adapted to be removably mounted on a powered shaft, the impeller including a bore opening for complimentary reception of the shaft. The bore opening of the impeller has a torque inducing surface which abuts a complimentary torque inducing surface on the shaft. The impeller includes a plurality of circumferentially spaced flexible finger members disposed in axially extending relation about the bore opening which include inwardly directed bosses for axially securing the impeller to the shaft, and a cap element to retain the finger members compressively against the shaft.

9 Claims, 1 Drawing Sheet

U.S. Patent  Jan. 2, 1990  4,890,982
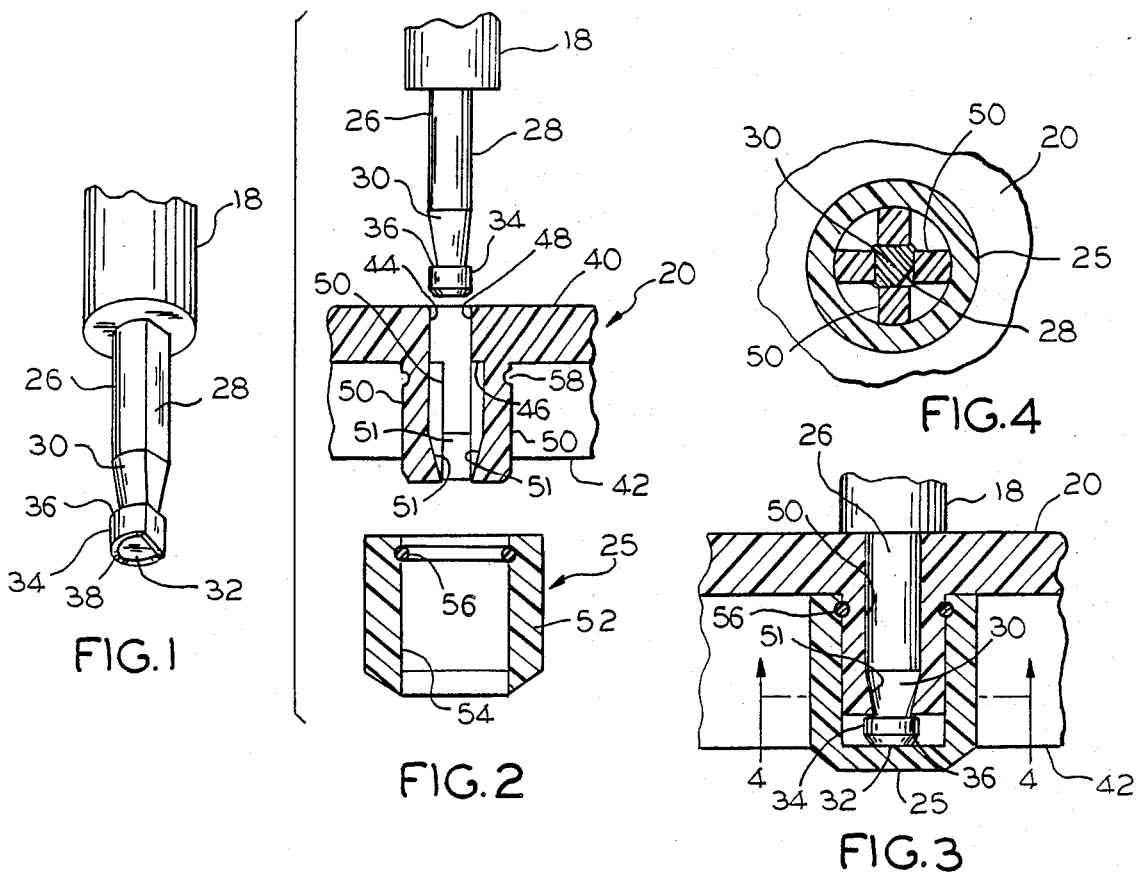
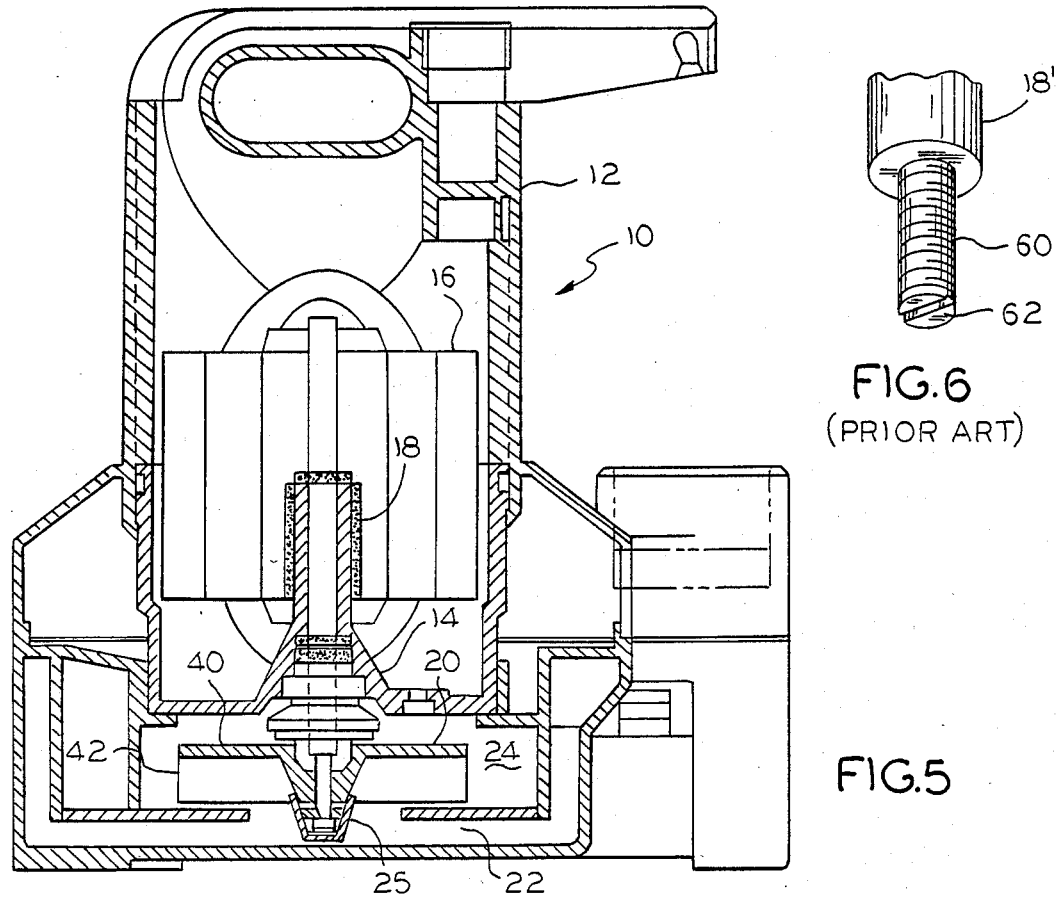

PUMP IMPELLER AND ROTOR SHAFT ATTACHMENT CONSTRUCTION

The present invention relates generally to pump construction, and more particularly to a novel apparatus for attaching an impeller to a pump rotor shaft.

BACKGROUND OF THE INVENTION

Impellers secured to drive shafts such as pump motor rotors are well known in the art. A common attachment method includes impellers bolted to the rotor shafts. Another method encompasses securing the impeller to the rotor shaft by threading the impeller onto the rotor shaft. Although these combinations have generally proven reliable, they have suffered from the expense for tooling to form threads on both the impeller and the rotor shaft. In addition, these combinations have generally suffered from the time required to manually thread the impeller onto the shaft. Also, these combinations have generally required the use of additional fittings such as washers and nuts. A need therefore exists for an attachment device for quickly and inexpensively securing a pump impeller to a rotor shaft member that avoids the time consuming and expensive tooling and threading requirements of the prior art.

Therefore, a primary object of the present invention is to provide a mounting device for positively securing an impeller to a pump rotor shaft member and to the combination of an impeller and rotor shaft member that incorporates the novel mounting device. The mounting device of the present invention may be formed as a portion of the impeller to provide an integrated structure with the rotor shaft.

A further object of the present invention is to provide a novel mounting device for positively securing an impeller to a pump rotor shaft which eliminates the need for threaded bolts on screw piece parts and other hardware.

Another object of the present invention is to provide a novel mounting device for positively securing an impeller to a pump rotor shaft which enables the impeller to be rapidly attached to or removed from the rotor shaft of a pump without the use of tools or devices to hold the rotor shaft from rotating while the impeller is being mounted on the rotor shaft, thus reducing assembly and labor costs.

Still another object of the present invention is to provide a novel mounting device for positively securing an impeller to a pump rotor shaft which is readily adaptable to automated assembly techniques.

SUMMARY OF THE INVENTION

These and other objects are provided by the present invention which consists of an apparatus for mounting an impeller on a powered shaft comprising a bore opening in the impeller for complimentary reception of the shaft, the bore opening having a torque inducing surface which is complimentary to a torque inducing surface on the shaft. The impeller includes a plurality of circumferentially spaced flexible finger members disposed in axially extending relation about the bore opening, the finger members having inwardly directed bosses for axially securing the impeller to the shaft, whereby the shaft is received in the opening in the impeller.

Extending over the finger members and forcing them into contactual engagement with the torque inducing surface of the shaft and with the remainder of the shaft is a cap which restricts the radial movement of the fingers. This construction provides a greater compressive or gripping effect between the rotor shaft and impeller, and substantially increases the torque capabilities of the pump. The cap is readily removable without tools to facilitate removal and replacement of impellers on the rotor shaft.

BRIEF DESCRIPTION OF THE DRAWINGS

FIG. 1 is a perspective view of a pump rotor shaft forming part of the present invention, showing the torque inducing flat portion of the shaft and the indented portion of the shaft for receiving the finger elements of the impeller;

FIG. 2 is an exploded elevational partial cut-away view illustrating the construction of the pump rotor shaft, impeller and cap elements of the present invention;

FIG. 3 is a partial cut-away front elevational view of the pump rotor shaft, impeller, and cap in their assembled condition;

FIG. 4 is an end sectional view of the assembly of FIG. 3 taken along line 4—4 in FIG. 3;

FIG. 5 is a partial cut-away elevation view of a typical pump in which the present invention may be utilized; and FIG. 6 is a perspective view of the end of a pump rotor shaft as constructed in the prior art.

DESCRIPTION OF THE PREFERRED EMBODIMENT

Referring first to FIG. 5, a typical pump is illustrated which has been constructed utilizing the novel rotor shaft and impeller mounting apparatus of the present invention. The pump, which is generally designated by the numeral 10, includes a housing 12 which includes motor mounting means 14 to which a motor 16 is secured. Motor 16 drives a rotor shaft 18 and an impeller 20 is attached for rotation with rotor shaft 18 in accordance with the teachings of the present invention. Impeller 20 is adapted to rotate in the base portion 22 of the pump 10 which, under operative conditions of the pump will contain fluid to be expelled through channel 24. A cap 25 engages a portion of impeller 20 as will be explained.

To maximize the efficiency of the operation of pump 10, it is important that impeller 20 be securely mounted for rotation with rotor shaft 18 with little or no lost motion. Another important objective is to be able to mount the impeller 20 on the rotor shaft 18 and remove the impeller from the shaft in a short period of time, with no tools, and without requiring rotor shaft 18 to be held against movement while the impeller 20 is being installed or removed. The present invention is directed to accomplishing these objectives.

Referring now to FIG. 1 the rotor shaft 18 includes a subtending portion 26 of smaller diameter than the main body of shaft 18. If desired, portion 26 may be of the same diameter as shaft 18 in keeping with the teachings of the present invention. At least one side of subtending portion 26 of shaft 18 includes an axially extending flat portion 28 which provides a torque inducing means to the impeller 20 as will be described.

Subtending portion 26 of rotor shaft 18 also includes a tapered portion 30 ending at a radially extending shoulder portion 34 having an abutment surface 36 facing tapered portion 30. The end 32 of the shaft 18 may optionally include a tapered portion 38 for purposes to be explained.

FIG. 2 illustrates the impeller 20 and cap 25 which are adapted to be attached to rotor shaft 18. Impeller 20 is preferably circular in shape having a disc-like body 40 to which are attached vane-like blades 42 to provide the requisite pumping action. A bore opening 44 extends axially through impeller 20, whereby bore opening 44 is adapted to complementary receive subtended portion 26 of shaft 18. Bore opening 44 includes an indented flange 46 having a flat face 48 which engages flat portion 28 of shaft 18 when the impeller 20 is mounted on shaft 18, as will be explained in more detail with reference to FIG. 3. Extending axially from bore opening 44 of impeller 20 are a plurality of circumferentially spaced flexible finger members 50 which substantially surround the bore opening 44. Each finger member 50 comprises inwardly directed boss elements 51. Due to the material of which impeller 20 is manufactured, finger elements 50 have sufficient degree of flexibility to be spread apart when forced open by shoulder 34 of rotor shaft 18, as will be explained, and to return to their normal position after shoulder 34 has passed the tips of the finger elements.

Cap element 25 comprises a generally cylindrically shaped body 52 having a centrally open portion 54 which is also cylindrically shaped. The inside diameter of open portion 54 is substantially equivalent to the outer diameter of finger members 50 of impeller 20. The body 52 of cap 25 is composed of a flexible material to permit the open end of portion 54 to expand, as shown in FIG. 5. Adjacent the end of open portion 54 of cap 29 is a bead 56 which is adapted to engage circumferential slot 58 of each of the finger members 50.

FIG. 3 illustrates the above-described elements when subtended portion 26 of shaft 18 is inserted into bore opening 44 of impeller 20 and cap 25 is installed over finger members 50. Shoulder portion 34 stretched finger members 50 outward as portion 26 of shaft 18 was being inserted downward (FIG. 3) into bore opening 44. Tapered portions 38 of the end of shaft 18 are provided to assist shaft 18 in entering bore opening 44 and pushing finger members outwardly. As soon as shoulder 34 passes the tips of finger members 50, the finger members snap back inwardly, whereby the boss elements 51 of the finger members engage the tapered or indented portion 30 of shaft 18. The outward tips of the finger members 50 abut the circular groove formed by the radially extending abutment surface 36 of shoulder portion 34. The combination of the boss elements 51 engaging the tapered portion 30 of subtended portion 26 of shaft 18, and of the outer tips of finger members 50 engaging abutment surface 36 of shoulder 34 restrain impeller 20 against axial movement relative to shaft 18. The contact between flat face 48 of impeller 20 and flat portion 28 of shaft 18 provides the torque inducing means for preventing relative rotative motion between impeller 20 and shaft 18, and locates the axial position of impeller 20 relative to shaft 18.

Cap 25 is then forced over finger elements 50 as they engage shaft 18 until bead 56 engages and snaps into slot 58, thereby holding cap 25 in place over finger members 50 and over the end 32 of rotor shaft 18. This is accomplished without the use of tools, or holding shaft 18 against rotation. Cap 25, because of its inherent structure, grasps the finger members 50 and forces them inwardly against tapered portion 30 of shaft 18, holding the finger members in tight engagement with the rotor shaft through the application of radial clamping forces by means of a hoop action produced by cap 25.

When the pump is operating, and motor 16 rotates shaft 18 and impeller 20, centrifugal forces tend to force finger members 50 outward, or to an open position. If allowed to move outward, the reduction in inwardly applied forces decreases the pressure applied by the fingers against tapered portion 30 of shaft 18, and of the pressure applied by flat face 48 against flat portion 28 of rotor shaft 18, resulting in a lower torque capability of the pump motor and impeller combination. This tendency towards reduced torque capability is overcome by the cap 25, which during operation of the pump 10 holds finger members 50 inward against tapered portion 30 of shaft 18 to resist the effects of centrifugal force and to compress the round portion of bore opening 44 of impeller 20 against corresponding round surfaces on shaft 18 to increase the torque capabilities of pump 10.

To remove impeller 20 from shaft 18, cap 25 is gripped and moved axially away from end 32 of shaft 18, whereby the side edges of cap 25 expand slightly and bead 56 is dislodged from slot 58. Continued axial movement of cap 25 results in the removal of the cap, and the finger elements 50 are no longer compressed toward shaft 18. After the cap is removed, finger elements 50 are manually spread apart a small amount whereby the boss elements 51 of the finger elements extend beyond shoulder portion 34 at the end of shaft 18. Impeller 20 may then be moved axially downward and off of shaft 18. Following this procedure, the removal of impeller 20 from shaft 18 is accomplished without tools, or the need to hold shaft 18 against rotation while removing the impeller.

The embodiment of the present invention described above and illustrated in FIGS. 1-5 of the drawing presents considerable advantages over prior structure for attaching a pump impeller to a rotor shaft. One such prior structure is partially disclosed in FIG. 6, which depicts a shaft 18, having a threaded subtended portion 60 extending therefrom. A pump impeller (not shown) having a threaded central bore opening is rotated and threaded on to, or off of, portion 60. This requires a separate tool to hold shaft 18' against rotation as the impeller is threaded on to or off of threaded portion 60. A screw 62 is driven by a screwdriver into a threaded bore at the end of portion 60 to hold the impeller onto shaft 18'. Obviously, shaft 18' must again be held against rotation while driving screw 62 in or removing the screw from its associated bore. This step also requires the use of additional tools, thereby increasing the costs associated with producing and operating a pump constructed in accordance with the prior art.

Those who are skilled in the art will readily perceive how to modify the presently disclosed invention while still keeping within the teachings of the invention. Therefore, the appended claims are to be construed to cover all equivalent structures which fall within the scope and spirit of the present invention.

I claim:

1. A pump including an impeller adapted to be removably mounted on a powered shaft, said impeller including a bore opening for complimentary reception of said shaft, said bore opening having a first torque inducing means which is complimentary to a second torque inducing means on said shaft, said impeller including a plurality of circumferentially spaced flexible finger members disposed in axially extending relation about said bore opening, said finger members having inwardly directed boss means for axially securing said impeller to said shaft, said finger members being restricted in radial movement by a flexible cap member releasably fitting over said finger members, and said shaft being received in said bore opening.

2. The pump as claimed in claim 1 which includes said flexible cap member releasably fitting over said finger members to restrict the radial movement of said finger members by a hoop action.

3. The pump as claimed in claim 2 wherein said shaft includes at least one indentation for engaging said finger members.

4. The pump as claimed in claim 3 wherein said indentation is a circular groove forming shoulder means on said shaft.

5. The pump as claimed in claim 4 wherein said shaft groove includes a tapered portion facing the end of the shaft and a radially extending shoulder portion facing the opposite direction, said finger members having a complimentary inner boss surface which cooperates with said tapered and shouldered portions to restrain said impeller against axial movement relative to said shaft, said flexible cap means radially retaining said finger members in said groove.

6. The pump as claimed in claim 1 wherein said torque inducing means on shaft and in said bore are cooperating flat means.

7. The pump as claimed in claim 6 wherein said flat means includes a chordally disposed planar surface of substantially identical diametral and axial lengths on said shaft and within said bore to produce the desired torque capability between said shaft and said impeller.

8. The device as claimed in claim 5 wherein said finger means are at least four in number.

9. A pump including an impeller adapted to be removably mounted for rotation by a powered shaft, said impeller including a bore opening for complimentary reception of said shaft, said shaft being received in said bore opening, said bore opening having a first torque inducing means which are complimentary to a second torque inducing means on said shaft, said impeller including a plurality of circumferentially spaced flexible finger members disposed in axially extending relation about said bore opening, means removably extending substantially around the outer circumference of said finger members to restrict the radial movement of said finger members when said shaft and said impeller are rotating and to maintain a compressive gripping force between said finger members and said shaft, said means removably extending substantially around said finger members comprises a cap member releasably fitting over said finger members.

* * * * *